United States Patent
Yamagiwa et al.

(10) Patent No.: US 6,838,984 B2
(45) Date of Patent: Jan. 4, 2005

(54) AIR PRESSURE DETECTION DEVICE FOR WHEEL

(75) Inventors: Toshio Yamagiwa, Saitama (JP); Tomoyuki Harada, Saitama (JP); Takashi Ashigai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/053,577

(22) Filed: Jan. 24, 2002

(65) Prior Publication Data

US 2002/0097147 A1 Jul. 25, 2002

(30) Foreign Application Priority Data

Jan. 24, 2001 (JP) ........................................ 2001-016385

(51) Int. Cl.[7] .............................................. B60C 23/00

(52) U.S. Cl. ....................... 340/445; 340/442; 340/447; 73/146.2; 73/146.3; 73/146.4

(58) Field of Search ................................. 340/445, 442, 340/447, 427, 432, 438; 73/146, 146.2, 146.3, 146.4

(56) References Cited

U.S. PATENT DOCUMENTS

| | | | | |
|---|---|---|---|---|
| 4,048,614 A | * | 9/1977 | Shumway | 340/442 |
| 4,425,558 A | * | 1/1984 | McConchie | 340/447 |
| 4,734,674 A | * | 3/1988 | Thomas et al. | 340/447 |
| 5,853,020 A | * | 12/1998 | Widner | 137/227 |
| 6,199,575 B1 | * | 3/2001 | Widner | 137/227 |
| 6,215,393 B1 | * | 4/2001 | Delaporte | 340/447 |

FOREIGN PATENT DOCUMENTS

| | | |
|---|---|---|
| EP | 1 048 495 A1 | 11/2000 |
| JP | 10-44726 A | 2/1998 |

* cited by examiner

Primary Examiner—Toan N. Pham
(74) Attorney, Agent, or Firm—Birch, Stewart, Kolasch & Birch, LLP (57) ABSTRACT

An air pressure detection device for a wheel includes an air pressure sensor provided on the side of a tire for detecting the tire pressure. A detection and transmission unit (transmission unit) is provided for transmitting information detected by the air pressure sensor. An electric cell is provided for driving the detection and transmission unit. The air pressure sensor is located inside the tire and is integrally fitted to an air valve. The electric cell is fitted to a portion of the air valve projecting from a rim. The invention enhances the fitting property of the air pressure sensor, and enhances the convenience in exchange of the electric cell.

16 Claims, 7 Drawing Sheets

AIR PRESSURE DETECTION DEVICE FOR WHEEL

CROSS-REFERENCE TO RELATED APPLICATIONS

The present application claims priority under 35 USC 119 to Japanese Patent Application No. 2001-016385 filed on Jan. 24, 2001 the entire contents thereof is hereby incorporated by reference.

BACKGROUND OF THE INVENTION

1. Field of the Invention

The present invention relates to an air pressure detection device for wheel for detecting the air pressure of a tire and making it possible for the driver to recognize the air pressure of the tire even during running of the vehicle.

2. Description of Background Art

An air pressure detection device for a wheel which enables the driver to recognize the air pressure of a tire even during the operation of the vehicle is known, for example, as disclosed in Japanese Unexamined Patent Publication No. Hei 1044726, "Tire Air Pressure Alarm Device."

Japanese Unexamined Patent Publication No. Hei 10-44726 discloses a tire air pressure alarm device in which, according to FIG. 1 of the publication, a valve stem 10 (symbols used in the publication are used here) is provided that is fitted to a wheel rim 1. A case 2 is disposed at a lower portion of the valve stem 10. A transmission unit 7 includes a pressure detecting portion 3, a signal processing circuit 4 and an electric cell 5 that are contained in the case 2.

However, since the above tire air pressure detection device is designed so that the pressure detecting portion 3, the signal processing circuit 4 and the electric cell 5 are contained in the case 2, which is fitted to a lower portion of the valve stem 10, it is difficult to exchange the electric cell when, for example, the life of the electric cell is shorter than the tire exchange interval.

This disenables effective utilization of the air pressure detection device, even though the device can detect the air pressure of the tire during operation of the vehicle. Namely, there is a demand for an air pressure detection device for wheel which can facilitate the exchange of the electric cell.

SUMMARY AND OBJECTS OF THE INVENTION

Accordingly, it is an object of the present invention to provide an air pressure detection device for a wheel which can facilitate the exchange of the electric cell.

In order to attain the above object, an air pressure detection device for a wheel is provided wherein an air pressure sensor is mounted on the tire side for detecting the air pressure of a tire. A transmission unit is provided for transmitting information detected by the air pressure sensor. An electric cell is provided for driving the transmission unit. The air pressure sensor is located inside the tire and is integrally fitted to an air valve of the wheel. The electric cell is fitted to a portion of the air valve projecting from a wheel rim of the wheel.

To detect the air pressure of a tire and to make it possible to know the air pressure of the tire even during operation of the vehicle provides effective driving information. Thus, the air pressure detection device for the wheel is constituted of the air pressure sensor, the transmission unit and the electric cell.

The air pressure sensor is located inside the tire, and the electric cell is fitted to a portion of the air valve projecting from the wheel rim of the wheel, whereby it is enabled to easily exchange the electric cell.

The electric cell is fitted to the portion of the air valve projecting from the wheel rim of the wheel, so that the electric cell can be exchanged at any time according to necessity, whereby enhancement of convenience in exchange of the electric cell is contrived.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below based on the attached drawings. The terms "front", "rear", "left", "right", "upper" and "lower" conform to the directions as viewed from the driver, and Fr means the front side, Rr means the rear side, L means the left side, and R means the right side.

Figure 1:
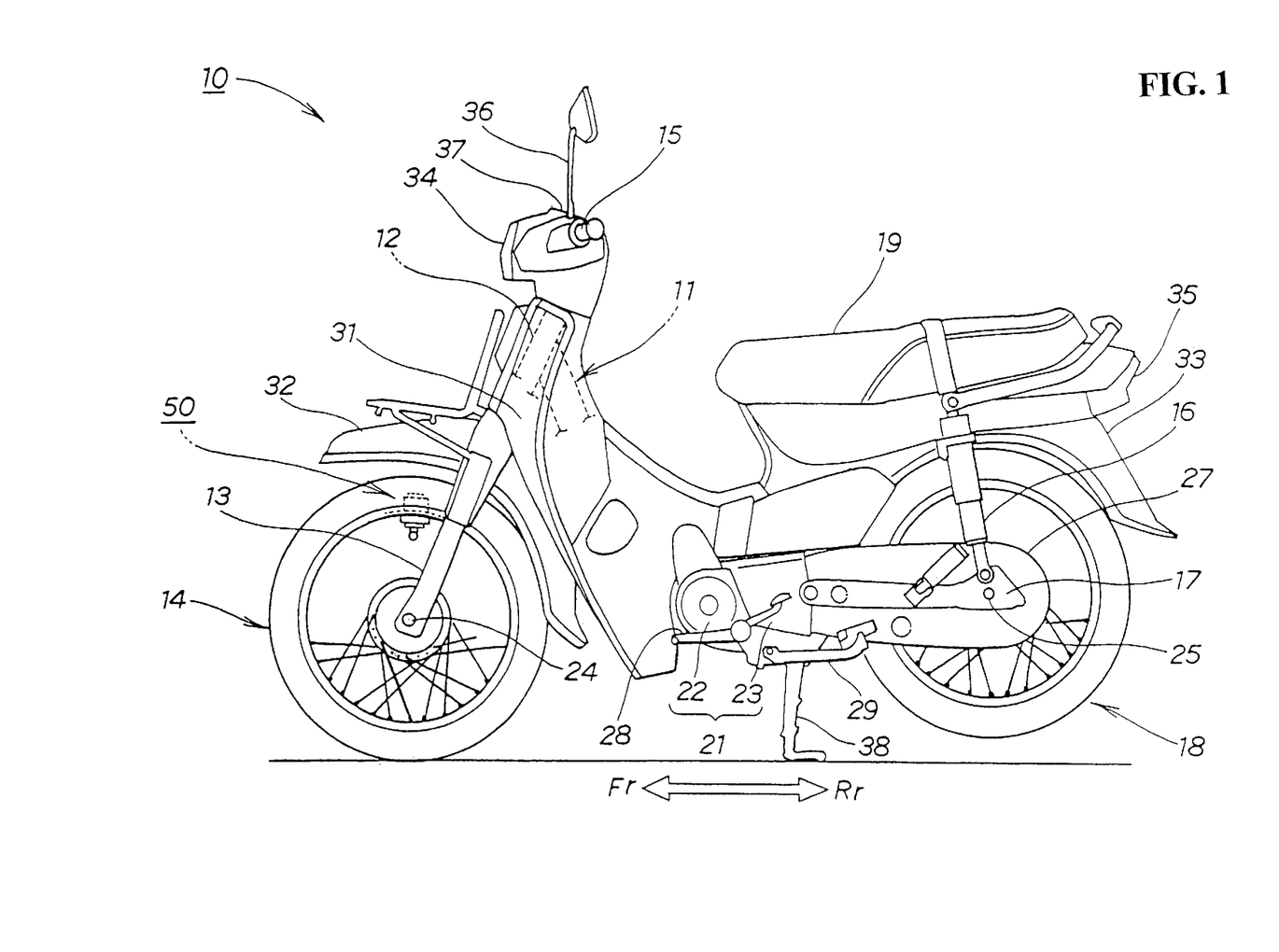
FIG. 1 is a side view of a motorcycle on which an air pressure detection device for a wheel according to the present invention is mounted.

FIG. 1 is a side view of a motorcycle on which the air pressure detection device for a wheel according to the present invention is mounted. The motorcycle 10 includes a vehicle body frame 11 extending toward a rear lower portion of the vehicle. A head pipe 12 is fitted to the vehicle body frame 11. A front fork 13 is fitted to the head pipe 12. A front wheel 14 is fitted to the front fork 13. A handle 15 is connected to the front fork 13. A rear suspension 16 includes one end fitted to a rear upper portion of the vehicle body frame 11. A swing arm 17 is swingably fitted between the other end of the rear suspension 16 and a rear lower portion of the vehicle body frame 11. A rear wheel 18 is fitted to the tip end of the swing arm 17. A seat 19 is disposed at a rear upper portion of the vehicle body frame 11. A power unit 21 includes an engine 22 and a speed change gear 23 that are disposed on the lower side of the vehicle body frame 11.

In FIG. 1, axles 24 and 25, a drive chain cover 27, a brake pedal 28, a kick pedal 29, a leg shield 31, a front fender 32, a rear fender 33, a head lamp 34, a tail lamp 35, a rear view mirror 36, a meter panel 37, and a stand 38 are illustrated as connected to the body frame 11.

An air pressure detection device 50 for the wheel (hereinafter referred to simply as "air pressure detection device 50"), which, as described later, is a device for detecting the air pressure of a tire and making it possible for the driver to recognize the air pressure of the tire even during operation of the vehicle.

Figure 2:
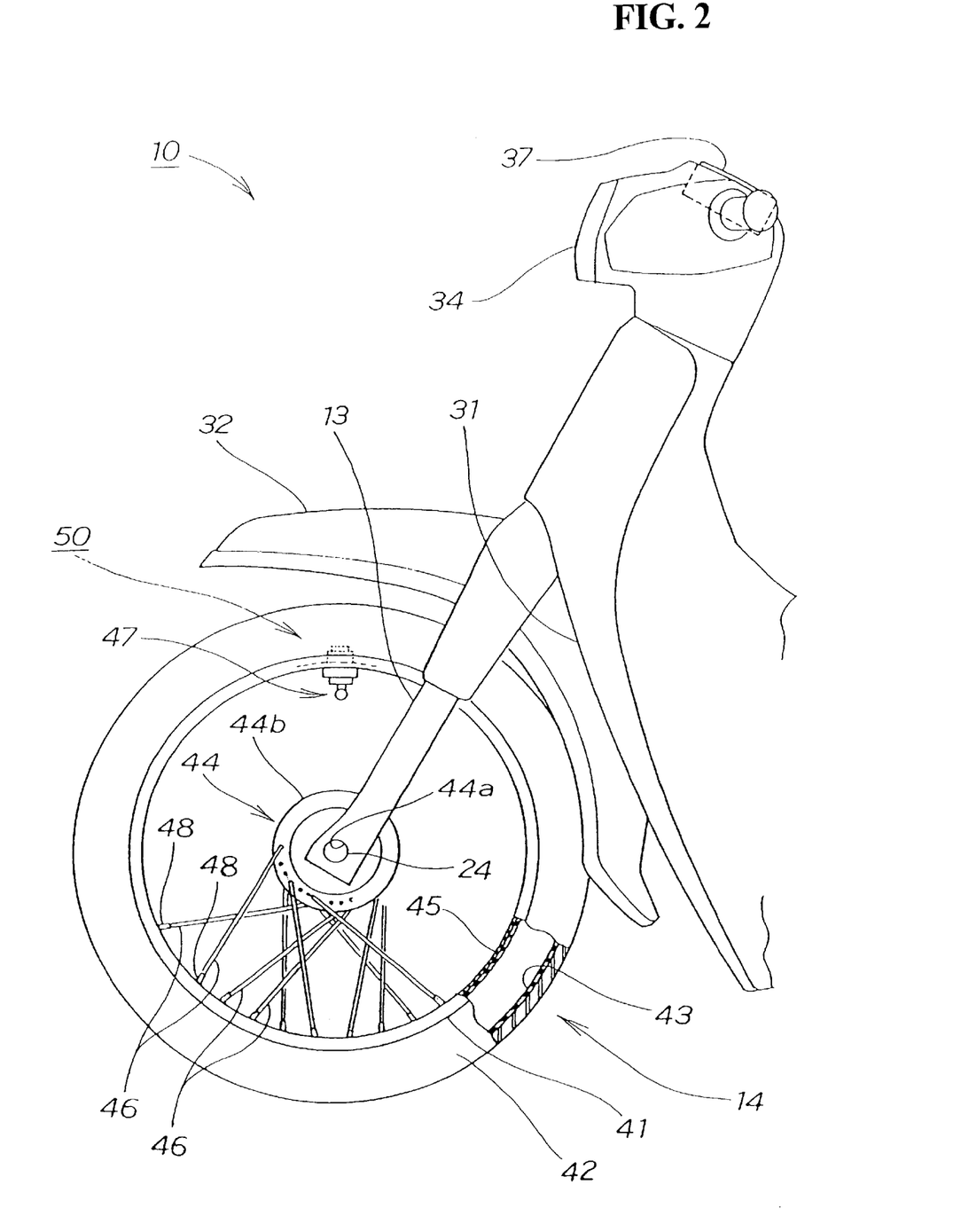
FIG. 2 is a side view of a front portion of the motorcycle on which the air pressure detection device for a wheel according to the present invention is mounted.

FIG. 2 is a side view of a front portion of the motorcycle on which the air pressure detection device for a wheel according to the present invention is mounted.

The wheel 14 includes a disk-form wheel 41, a tire 42 is fitted to the wheel 41, and a tire tube 43 is positioned between the wheel 41 and the tire 42, and is provided with the air pressure detection device 50 intermediately disposed between the tire tube 43 and the wheel 41.

Figure 3:
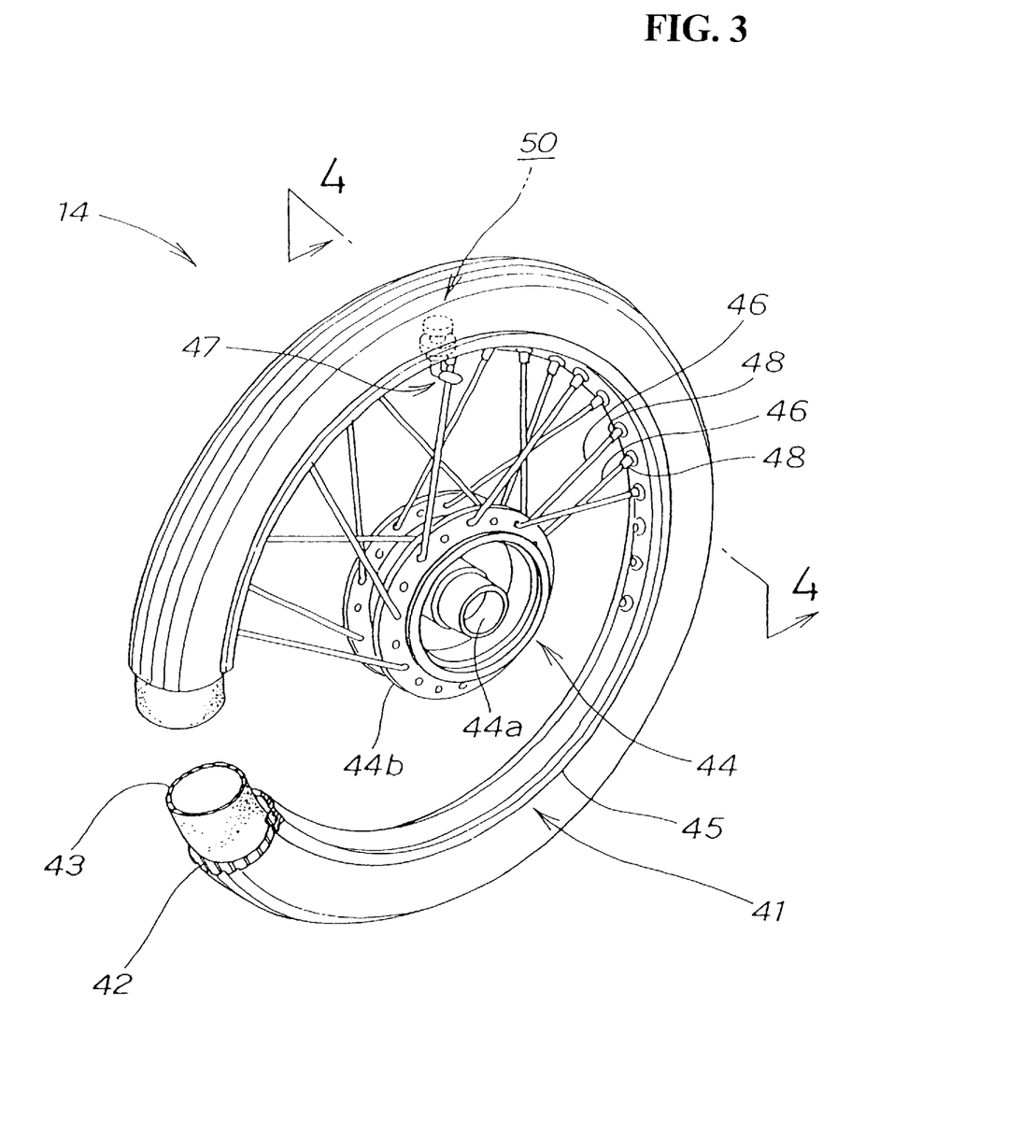
FIG. 3 is a perspective view of a wheel on which the air pressure detection device for wheel according to the present invention is mounted.

FIG. 3 is a perspective view of a wheel on which the air pressure detection device for a wheel according to the present invention is mounted. The wheel 41 includes a hub 44 rotatably fitted to the axle 24. A wheel rim 45 (hereinafter referred to simply as "rim 45") is provided on which the tire 42 is fitted. A plurality of spokes 46 ... ( ... means plurality, here and hereinafter) are provided for connecting the rim 45 and the hub 44.

The hub 44 includes a bearing portion 44a fitted to the axle 24 through a bearing (not shown), and disk portions 44b ... to which the plurality of spokes 46 ... are hooked. The rim 45 includes an air valve 47 for feeding air into the tire 42.

The spoke 46 has one end hooked on the disk portion 44b of the hub 44, and has the other end fitted to the rim 45 through a nipple 48, whereby the rim 45 and the hub 44 are integrally connected to each other.

Incidentally, the rear wheel 18 shown in FIG. 1 has substantially the same construction as the front wheel 14, and, therefore, detailed description thereof is omitted.

Figure 4:
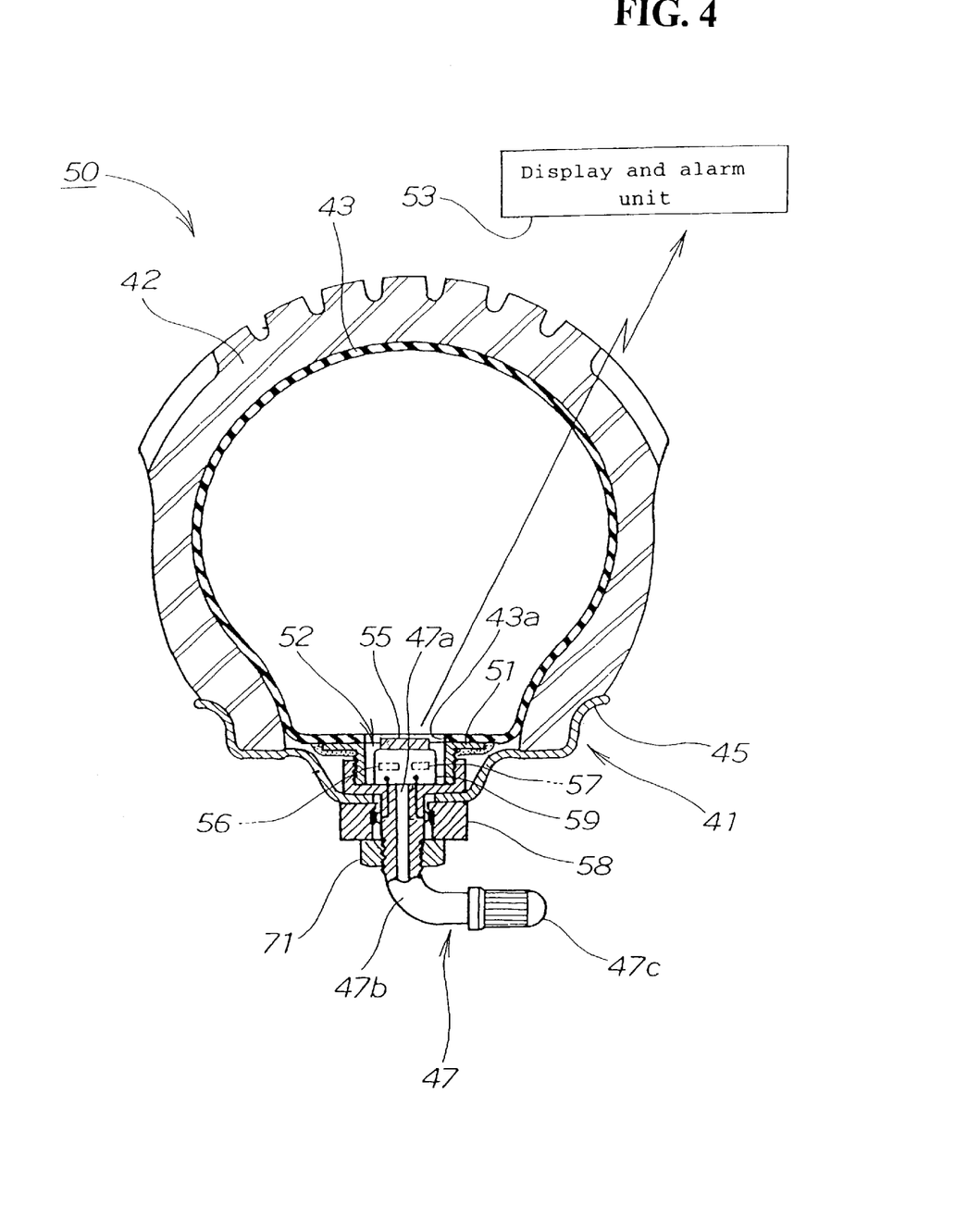
FIG. 4 is a sectional view taken along line 4—4 of FIG. 3.

FIG. 4 is a sectional view taken along line 4—4 of FIG. 3, for illustrating the front section of the air pressure detection device 50.

The air pressure detection device 50 includes a seat portion 51 fitted to an opening portion 43a of the tire tube 43. An air valve 47 is fitted to the seat portion 51. An air pressure sensor 55 is fitted on the tire 42 side of the air valve 47 for detecting the air pressure. A detection and transmission unit 52 as a transmission unit is provided on the tire 42 side of the air valve 47 for detecting the pressure information from the air pressure sensor 55, transforming the pressure information into an electrical signal and emitting the electrical signal through electromagnetic waves. An electric cell 58 is fitted on the rim 45 side of the air valve 47 for driving the detection and transmission unit 52. A display and alarm unit 53 is provided for receiving the pressure information from the detection and transmission unit 52 and for making a display or an alarm. The display and alarm unit 53 is provided at the meter panel 37 (See FIG. 2) as described later. A pipe 47a of the air valve 47 is provided with a portion 47b of the air pressure valve 47 projecting from the rim 45. A cap 47c is detachably fitted to the air pressure valve 47. A nut 71 is provided for fixing the detection and transmission unit 52 to the air pressure valve 47.

The detection and transmission unit 52 includes a detection circuit 56 connected to the air pressure sensor 55 for picking up the pressure information as an electrical signal, a transmission circuit 57 for emitting the electrical signal of the detection circuit 56 through electromagnetic waves, and a case 59 is provided for collectively containing the detection circuit 56 and the transmission circuit 57.

The air pressure sensor 55 is located inside the tire 42 and is integrally fitted to the air valve 47.

The electric cell 58 is fitted to the portion 47b of the air valve 47 projecting from the rim 45.

The air pressure detection device 50 is an air pressure detection device for a wheel including the air pressure sensor 55 provided on the tire 42 side for detecting the tire pressure. The detection and transmission unit 52 (transmission unit) is provided for transmitting the information sensed by the air pressure sensor 55. The electric cell 58 is provided for driving the detection and transmission unit 52. The air pressure sensor 55 is located inside the tire 42 and is integrally fitted to the air valve 47. The electric cell 58 is fitted to the portion 47b of the air valve 47 projected from the rim 45.

To detect the tire pressure and make it possible to check the tire pressure even during the operation of the vehicle provides effective driving information. In addition, it is preferable to make it possible to easily exchange the electric cell 58 which is a component part of the air pressure detection device 50.

In view of this, the air pressure detection device 50 includes the air pressure sensor 55, the detection and transmission unit 52 (transmission unit) and the electric cell 58, wherein the air pressure sensor 55 is located inside the tire 42 and is integrally fitted to the air valve 47. The electric cell 58 is fitted to the portion 47b of the air valve 47 projecting from the rim 45.

In the air pressure detection device 50, the air pressure sensor 55 is located inside the tire 42 and is integrally fitted to the air valve 47, so that it is possible to contrive an enhancement of fitting property of the air pressure sensor 55.

In the air pressure detection device 50, the electric cell 58 is fitted to the portion 47b of the air valve 47 projecting from the rim 45, so that it is possible to contrive an enhancement of the convenience when exchanging the electric cell.

Figure 5:
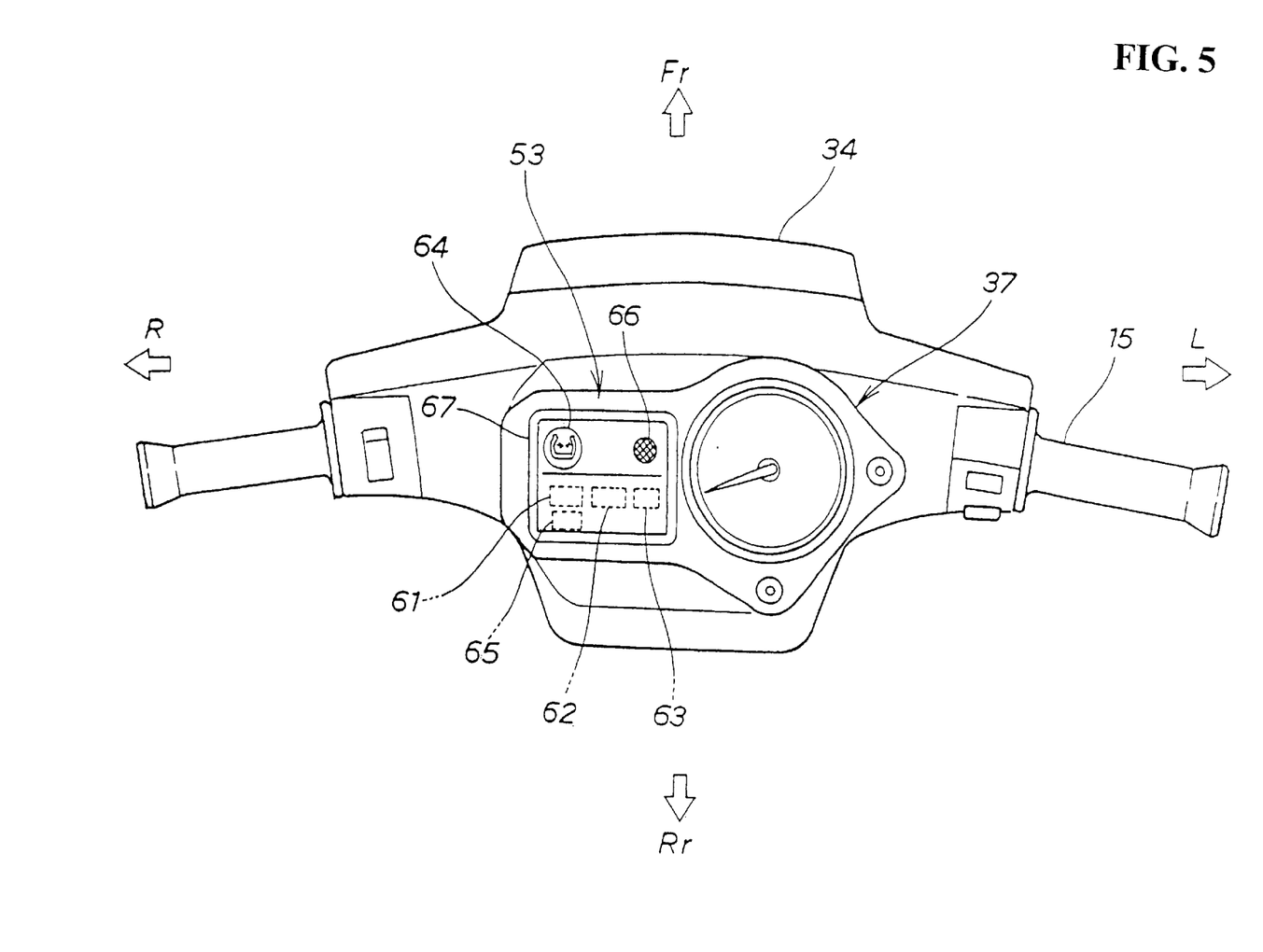
FIG. 5 is a plan view of a display and alarm unit of the air pressure detection device for wheel according to the present invention.

FIG. 5 is a plan view of a display and alarm unit of the air pressure detection device for a wheel according to the present invention, that illustrates the surface of the meter panel 37 fitted to the handle 15.

The display and alarm unit 53, which is provided at the meter panel 37, includes a reception circuit 61 for receiving the electromagnetic waves emitted from the detection and transmission unit 52 shown in FIG. 3. A voltage amplifying circuit 62 is provided for amplifying the signal received by the reception circuit 6. A display circuit 63 is provided for displaying the tire pressure based on the voltage value amplified by the voltage amplifying circuit 62. A display means 64 is driven by the display circuit 63. An alarm driving circuit 65 is operated when the voltage value amplified by the voltage amplifying circuit 62 is lower than a preset voltage value. An alarm means 66 is driven by the alarm driving circuit 65. A housing 67 is provided for collectively containing the reception circuit 61, the voltage amplifying circuit 62, the display circuit 63, the display means 64, the alarm driving circuit 65 and the alarm means 66.

Figure 6:
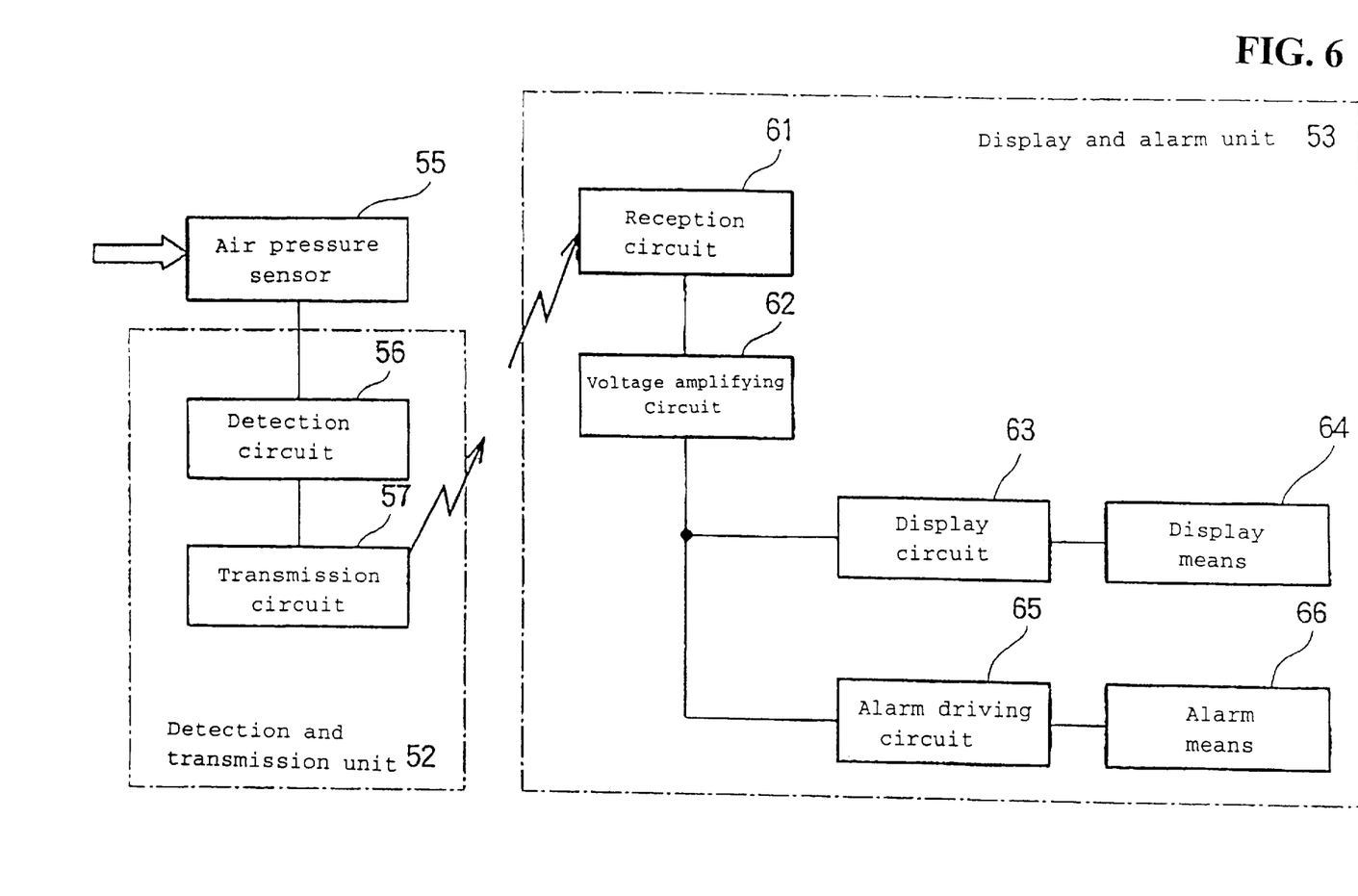
FIG. 6 is a block diagram of the air pressure detection device for a wheel according to the present invention.

The action or effect of the air pressure detection device 50 described above will be described below with reference to FIG. 6 which illustrates a block diagram of the air pressure detection device for a wheel according to the present invention, wherein the tire pressure is detected by the air pressure sensor 55, the pressure information is picked up as an electrical signal by the detection circuit 56, and the electrical signal is transmitted to the side of the display and alarm unit 53 by the transmission circuit 57.

The electromagnetic waves emitted from the detection and transmission unit 52 are received by the reception circuit 61. The signal received by the reception circuit 61 is amplified by the voltage amplifying circuit 62. The voltage value amplified by the voltage amplifying circuit 62 is transformed into a predetermined signal by the display circuit 63 for displaying a tire pressure according to the amplified voltage value. The tire pressure is displayed by the display means 64.

When the voltage value amplified by the voltage amplifying circuit 62 is lower than a preset voltage value, the alarm driving circuit 65 is operated, and the condition of insufficient tire pressure is communicated by the alarm means 66.

Figure 7:
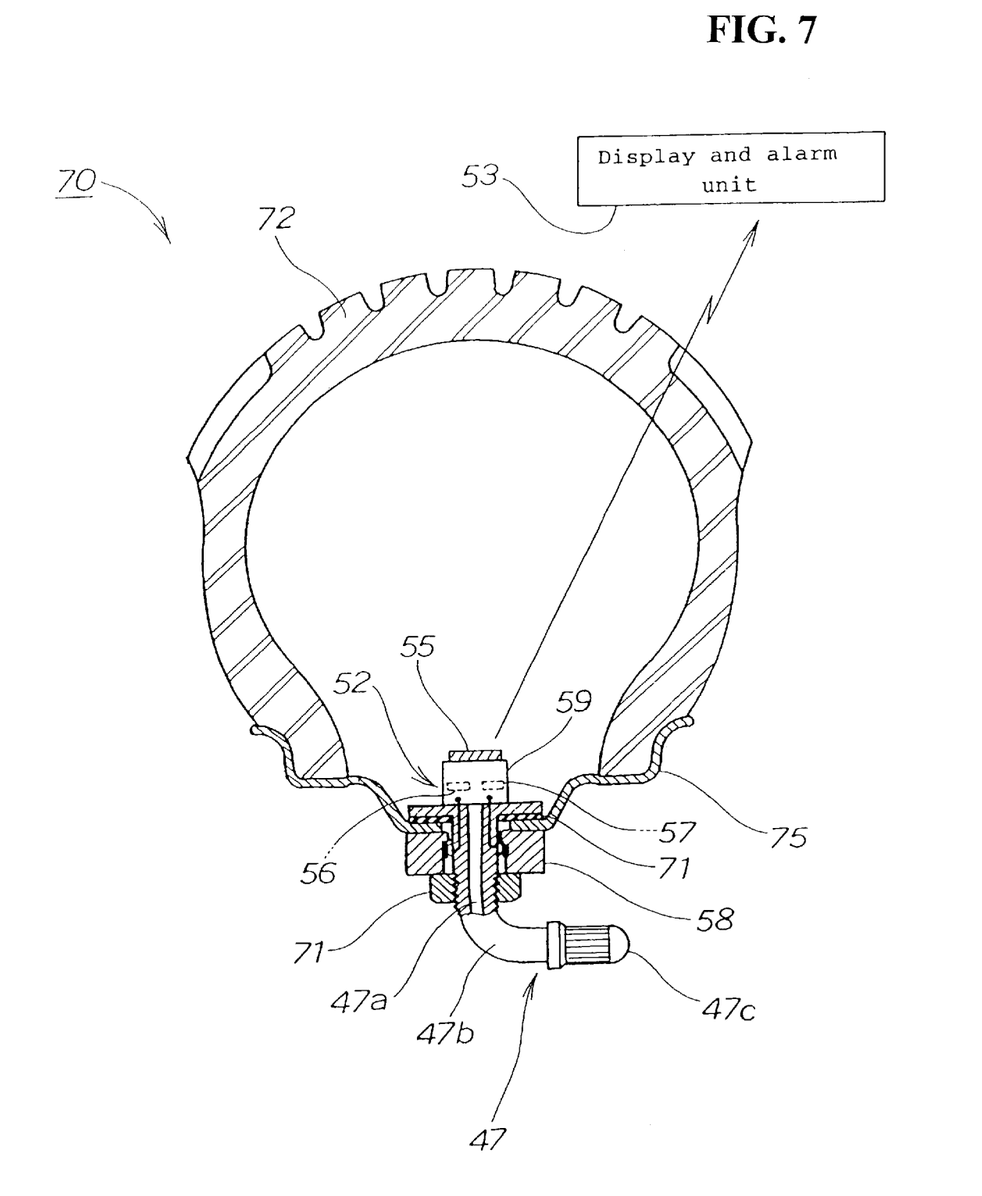
FIG. 7 is an air pressure detection device for a wheel according to a second embodiment of the present invention.

FIG. 7 is a side view of the air pressure detection device for a wheel according to a second embodiment of the present invention. The same components as those in the air pressure detection device 50 (See FIG. 4) are denoted by the same symbols, and detailed description thereof is omitted.

The air pressure detection device 70 is an air pressure detection device for a wheel comprising an air pressure sensor 55 provided on the side of a tubeless tire 72 (hereinafter referred to simply as "tire") for detecting the tire pressure of the tire 72. A detection and transmission unit 52 (transmission unit) is provided for transmitting the information sensed by the air pressure sensor 55, and an electric cell 58 for driving the detection and transmission unit 52, wherein the air pressure sensor 55 is located inside the tire 42 and is integrally fitted to an air valve 47. The electric cell 58 is fitted to a portion 47b of the air valve 47 projecting from a rim 75. FIG. 7 illustrates the embodiment in which the tubeless tire 72 not using a tire tube is equipped with the air pressure detection device 70 including the air pressure sensor 55, the detection and transmission unit 52, and the electric cell 58.

A packing 71 is intermediately provided between the air valve 47 and the rim 75.

While the vehicle has been described as a motorcycle 10 as shown in FIG. 1 in the above embodiments, the vehicle is not limited to a motorcycle, and may be a four-wheel or three-wheel vehicle.

Although, the display means 64 and the alarm means 66 are provided on the meter panel 37 as shown in FIG. 4 in the above embodiments, this construction is not limitative. For example, means issuing an alarm may be provided at the vehicle body frame or a helmet or the like, and means utilizing vibration may be provided at the seat or helmet or the like. While the display and alarm unit 53 has been described as a unit for the front wheel 14 (See FIG. 1), the unit performs the display and alarm actions also for the rear wheel 18 (See FIG. 1).

Further, the air pressure detection device may be for a tubed tire as shown in FIG. 4 in the embodiment, and the air pressure detection device may be for a tubeless tire as shown in FIG. 7.

The present invention, constructed as above, provides an air pressure detection device for a wheel including an air pressure sensor provided on the tire side for detecting the air pressure of a tire, a transmission unit for transmitting information detected by the air pressure sensor, and an electric cell for driving the transmission unit. The air pressure sensor is located inside the tire and is integrally fitted to an air valve of a wheel. The electric cell is fitted to a portion of the air valve projecting from a wheel rim of the wheel.

The air pressure sensor is located inside the tire and is integrally fitted to the air valve of the wheel, whereby it is possible to contrive an enhancement of a fitting property of the air pressure sensor. In addition, the electric cell is fitted to the portion of the air valve projected from the wheel rim of the wheel, whereby it is possible to contrive an enhancement of convenience in exchange of the electric cell.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air pressure detection device for a wheel comprising:
   an air pressure sensor for detecting the air pressure of a tire tube;
   a transmission unit for transmitting information detected by said air pressure sensor; and
   an electric cell for driving said transmission unit;
   wherein said air pressure sensor and said transmission unit are adapted to be located inside a tire tube and are integrally mounted on an air valve of a wheel, and said electric cell is mounted directly on a wheel rim of a wheel in such a manner as to surround a portion of said air valve projecting from the wheel rim of the wheel.

2. The air pressure detection device for a wheel according to claim 1, wherein said electric cell is positioned within a housing that is secured between the wheel rim and a threaded portion of said air valve.

3. The air pressure detection device for a wheel according to claim 2, and further including a securing means mounted on said threaded portion of said air valve for securing said electric cell relative to said air valve.

4. The air pressure detection device for a wheel according to claim 1, wherein said transmission unit includes a detection circuit operatively connected to said air pressure sensor for converting the air pressure into an electrical signal.

5. The air pressure detection device for a wheel according to claim 4, wherein said transmission unit further includes a transmission circuit for emitting the electrical signal of the detection circuit as electromagnetic waves.

6. An air pressure detection device for a wheel comprising:
   an air pressure sensor for detecting the air pressure of a tubeless tire;
   a transmission unit for transmitting information detected by said air pressure sensor; and
   an electric cell for driving said transmission unit;
   wherein said air pressure sensor and said transmission unit are adapted to be located inside a tubeless tire and are integrally mounted on an air valve of a wheel, and said electric cell is mounted on a portion of said air valve projecting inwardly from a wheel rim toward a center of a wheel.

7. The air pressure detection device for a wheel according to claim 6, wherein said electric cell is positioned within a housing that is secured between a wheel rim and a threaded portion of said air valve.

8. The air pressure detection device for a wheel according to claim 7, and further including a securing means mounted on said threaded portion of said air valve for securing said electric cell relative to said air valve.

9. The air pressure detection device for a wheel according to claim 6, wherein said transmission unit includes a detection circuit operatively connected to said air pressure sensor for converting the air pressure into an electrical signal.

10. The air pressure detection device for a wheel according to claim 9, wherein said transmission unit further includes a transmission circuit for emitting the electrical signal of the detection circuit as electromagnetic waves.

11. The air pressure detection device for a wheel according to claim 6, and further including a seal for providing an air tight connection between said air valve and said tubeless tire.

12. An air pressure detection device comprising:
   an air pressure sensor for detecting air pressure powered by a cell mounted on a side of a wheel rim facing a wheel center; and
   a transmission unit operatively connected to said air pressure sensor for transmitting information detected by said air pressure sensor;
   wherein said air pressure sensor and said transmitting unit are adapted to be located inside a tire and are integrally mounted on an air valve.

13. The air pressure detection device according to claim 12, wherein said transmission unit includes a detection circuit operatively connected to said air pressure sensor for converting the air pressure into an electrical signal.

14. The air pressure detection device according to claim 13, wherein said transmission unit further includes a transmission circuit for emitting the electrical signal of the detection circuit as electromagnetic waves.

15. The air pressure detection device according to claim 12, wherein said tire is a tubeless tire and further including a seal for providing an air tight connection between said air valve and the tubeless tire.

16. The air pressure detection device according to claim 12, wherein said tire is a tube tire.

* * * * *